United States Patent
Kitamura et al.

(10) Patent No.: US 10,907,541 B2
(45) Date of Patent: Feb. 2, 2021

(54) TURBINE HOUSING, EXHAUST TURBINE, AND TURBOCHARGER

(71) Applicant: MITSUBISHI HEAVY INDUSTRIES ENGINE & TURBOCHARGER, LTD., Sagamihara (JP)

(72) Inventors: Tsuyoshi Kitamura, Tokyo (JP); Toyotaka Yoshida, Tokyo (JP); Toru Hoshi, Tokyo (JP); Motoki Ebisu, Sagamihara (JP)

(73) Assignee: MITSUBISHI HEAVY INDUSTRIES ENGINE & TURBOCHARGER, LTD., Sagamihara (JP)

( * ) Notice: Subject to any disclaimer, the term of this patent is extended or adjusted under 35 U.S.C. 154(b) by 70 days.

(21) Appl. No.: 16/313,302

(22) PCT Filed: Dec. 16, 2016

(86) PCT No.: PCT/JP2016/087599
§ 371 (c)(1),
(2) Date: Dec. 26, 2018

(87) PCT Pub. No.: WO2018/109934
PCT Pub. Date: Jun. 21, 2018

(65) Prior Publication Data
US 2019/0234304 A1 Aug. 1, 2019

(51) Int. Cl.
*F02C 6/12* (2006.01)
*F02B 39/00* (2006.01)
(Continued)

(52) U.S. Cl.
CPC .............. *F02C 6/12* (2013.01); *F01D 17/16* (2013.01); *F02B 37/002* (2013.01); *F02B 37/18* (2013.01);
(Continued)

(58) Field of Classification Search
CPC ........ F02B 37/18; F02B 37/002; F01D 25/26; F01D 25/14; F01D 25/145; F01D 25/265; F04D 29/5853; F04D 29/4286
See application file for complete search history.

(56) References Cited

U.S. PATENT DOCUMENTS

2012/0201655 A1 8/2012 Kusakabe et al.
2014/0072412 A1* 3/2014 Marques ............... F02B 37/183
415/144
(Continued)

FOREIGN PATENT DOCUMENTS

CN 104533603 A 4/2015
DE 103 07 028 B3 5/2004
(Continued)

OTHER PUBLICATIONS

Paulov, Translation of WO2017001140, Jan. 5, 2017 (Year: 2017).*
(Continued)

*Primary Examiner* — Courtney D Heinle
*Assistant Examiner* — Michael K. Reitz
(74) *Attorney, Agent, or Firm* — Birch, Stewart, Kolasch & Birch, LLP.

(57) ABSTRACT

A turbine housing includes: a housing body which includes a turbine housing part housing a turbine wheel, an inlet section forming an inlet flow passage for guiding exhaust gas to the turbine housing part, an outlet section forming an outlet flow passage for discharging the exhaust gas from the turbine housing part, and a waste-gate flow passage which brings the inlet flow passage and the outlet flow passage into communication so as to bypass the turbine housing part; and a sleeve disposed along an inner wall surface of the housing body forming the waste gate flow passage, at least on a (Continued)

downstream side of the waste-gate flow passage of the housing body with respect to a flow direction of the exhaust gas.

13 Claims, 6 Drawing Sheets

(51) Int. Cl.
- *F02B 37/00* (2006.01)
- *F02B 37/18* (2006.01)
- *F04D 29/58* (2006.01)
- *F01D 17/16* (2006.01)

(52) U.S. Cl.
CPC .......... *F02B 39/00* (2013.01); *F04D 29/5853* (2013.01); *F05B 2220/302* (2013.01); *F05B 2230/50* (2013.01)

(56) References Cited

U.S. PATENT DOCUMENTS

| | | |
|---|---|---|
| 2015/0337858 A1 | 11/2015 | Joergl et al. |
| 2015/0361873 A1 | 12/2015 | Matsui |

FOREIGN PATENT DOCUMENTS

| | | | |
|---|---|---|---|
| JP | 62-29724 A | 2/1987 | |
| JP | 2005-266892 A | 9/2005 | |
| JP | 2016-3573 A | 1/2016 | |
| JP | 2016-75287 A | 5/2016 | |
| WO | WO 2012/127531 A1 | 9/2012 | |
| WO | WO 2016/126623 A1 | 8/2016 | |
| WO | WO-2017001140 A1 * | 1/2017 | ......... F16K 27/0227 |

OTHER PUBLICATIONS

Office Action dated Sep. 3, 2019 issued to the corresponding Japanese Application No. 2018-528814.
International Preliminary Report on Patentability and Written Opinion of the International Searching Authority for International Application No. PCT/JP2016/087599, dated Jun. 27, 2019, with English translation.
International Search Report for International Application No. PCT/JP2016/087599, dated Feb. 28, 2017.
Extended European Search Report dated Dec. 6, 2019 issued to the corresponding European Application No. 16923799.7.
Office Action dated Jun. 2, 2020 issued in counterpart Chinese Application No. 201680087885.0.
Office Action dated Jun. 18, 2020 issued in counterpart EPC Application No. 16923799.7.

* cited by examiner

EXHAUST GAS

EXHAUST GAS

TURBINE HOUSING, EXHAUST TURBINE, AND TURBOCHARGER

TECHNICAL FIELD

The present disclosure relates to a turbine housing, an exhaust turbine, and a turbocharger.

BACKGROUND ART

A known exhaust turbine is driven by utilizing energy of exhaust gas discharged from an internal combustion engine of an engine or the like. An exhaust turbine includes a turbine housing which accommodates a turbine wheel. The turbine housing has a high thermal capacity, and thus may take thermal energy from high-temperature exhaust gas and cause thermal loss, upon contact with the exhaust gas.

Thus, in Patent Document 1, a sleeve is mounted to an inlet region and an outlet region of the turbine housing, to reduce the area of direct contact between exhaust gas and an inner wall surface of the turbine housing.

Further, in Patent Document 2, the turbine casing includes an inner shell casing integrally including a waste-gate flow passage and a scroll flow passage, and an outer shell casing supporting the inner casing. Furthermore, the inner shell casing that makes contact with high-temperature gas is formed of ceramic, to suppress escape of heat to the outside.

CITATION LIST

Patent Literature

Patent Document 1: JP2005-266892A
Patent Document 2: JPS62-29724A

SUMMARY

Problems to be Solved

However, in Patent Document 1, the inner wall surface of the turbine housing at the waste-gate flow passage makes direct contact with high-temperature exhaust gas, which causes heat input from exhaust gas to the turbine housing at the waste-gate flow passage, and thermal energy loss of exhaust gas.

Further, in Patent Document 2, the turbine casing includes an inner shell casing integrally including a waste-gate flow passage and a scroll flow passage, and an outer shell casing supporting the inner casing, which makes the structure of the turbine casing complex. Thus, it is difficult to produce the turbine casing.

In view of the above, an object of some embodiments according to the present invention is to provide a turbine housing, an exhaust turbine, and a turbocharger having a high manufacturability, whereby it is possible to suppress loss of thermal energy of exhaust gas.

Solution to the Problems (1) According to some embodiments of the present invention, a turbine housing includes: a housing body which includes a turbine housing part housing a turbine wheel, an inlet section forming an inlet flow passage for guiding exhaust gas to the turbine housing part, an outlet section forming an outlet flow passage for discharging the exhaust gas from the turbine housing part, and a waste-gate flow passage which brings the inlet flow passage and the outlet flow passage into communication so as to bypass the turbine housing part; and a sleeve disposed along an inner wall surface of the housing body forming the waste gate flow passage, at least on a downstream side of the waste-gate flow passage of the housing body with respect to a flow direction of the exhaust gas.

With the above configuration (1), the sleeve is disposed at least on the downstream side of the waste-gate flow passage of the housing body with respect to the flow direction of exhaust gas, along the inner wall surface of the housing body forming the waste-gate flow passage, and thus it is possible to reduce the contact area between exhaust gas and the inner wall surface of the housing body forming the waste-gate flow passage, and suppress thermal energy loss of exhaust gas. Further, since the sleeve is provided separately from the housing body, and only the sleeve needs to be machined upon production of the turbine housing. Thus, the turbine housing can be produced easily compared to the above described typical turbine housing including an inner shell casing and an outer shell casing.

(2) In an illustrative embodiment, in the above configuration (1), the sleeve includes a plurality of sections divided along the flow direction of the exhaust gas.

With the above configuration (2), each sleeve includes a plurality of sections divided along the flow direction of exhaust gas, and thus it only needs to machine the sleeve by sections upon production of the turbine housing, and the manufacturability is improved compared to a turbine casing that includes a sleeve having an integrated structure.

(3) In an illustrative embodiment, in the above configuration (1) or (2), the sleeve has a cylindrical shape extending along the flow direction of the exhaust gas.

With the above configuration (3), the sleeve has a cylindrical shape extending along the flow direction of exhaust gas, and thus it is possible to machine the sleeve easily upon production, compared to a sleeve having a curved complex shape, and the turbine housing can be produced more easily.

Furthermore, since the sleeve has a cylindrical shape extending along the flow direction of exhaust gas, the sleeve can be easily inserted in the waste-gate flow passage compared to a sleeve having a curved complex shape when producing the turbine housing by inserting the sleeve into the waste-gate flow passage from the side of the outlet section toward the inlet section of the housing body, and thus the turbine housing can be produced more easily.

(4) In an illustrative embodiment, in any one of the above configurations (1) to (3), the sleeve is disposed only on the downstream side of the waste-gate flow passage of the housing body with respect to the flow direction of the exhaust gas.

Herein, the inner wall surface of the housing body on the upstream side of the waste-gate flow passage with respect to the flow direction of exhaust gas may be formed to have a complex curved surface shape, to guide exhaust gas smoothly from the inlet section of the housing body. In this case, providing the sleeve over the entire length of the waste-gate flow passage may make it difficult to achieve the originally-designed curved surface shape of the waste-gate flow passage.

With the above configuration (4), the sleeve is disposed only on the downstream side of the waste-gate flow passage of the housing body with respect to the flow direction of exhaust gas, and thus it is possible to provide the sleeve along the inner wall surface of the housing body without obstructing the curved surface shape of the inner wall surface, even in a case where the inner wall surface of the housing body has a complex curved surface shape on the upstream side of the waste-gate flow passage with respect to the flow direction of exhaust gas.

(5) In an illustrative embodiment, in any one of the above configurations (1) to (4), the housing body includes a concave portion disposed along a peripheral edge of an opening end on the downstream side of the waste-gate flow passage of the housing body with respect to the flow direction of the exhaust gas, and the sleeve includes a convex portion disposed so as to project outward in a radial direction of the sleeve so as to be engaged with the concave portion.

With the above configuration (5), the concave portion of the housing body disposed along the peripheral edge of the opening end of the downstream side of the waste-gate flow passage with respect to the flow direction of exhaust gas is engaged with the convex portion disposed projecting outward in the radial direction of the sleeve, and thus it is possible to determine the position of the sleeve relative to the housing body. In this way, it is possible to assemble the sleeve with the housing body easily, and the manufacturability of the turbine housing is improved.

(6) In an illustrative embodiment, in the above configuration (5), the turbine housing further includes a fixing piece for fixing the sleeve to the housing body. The convex portion of the sleeve is held between the fixing piece and the housing body while being in engagement with the concave portion of the housing body.

With the above configuration (6), the convex portion of the sleeve is held between the fixing piece and the housing body while being engaged with the concave portion of the housing body, and thus the sleeve can be firmly fixed to the housing body.

(7) In an illustrative embodiment, in any one of the above configurations (1) to (6), the sleeve is supported on the housing body so that a gap is formed between the inner wall surface of the housing body forming the waste-gate flow passage and an outer surface of the sleeve.

With the above configuration (7), a gap is formed between the outer surface of the sleeve and the inner wall surface of the housing body forming the waste-gate flow passage. Thus, it is possible to suppress heat input to the housing body from exhaust gas with the gap, and to suppress loss of thermal energy of exhaust gas even further.

(8) In an illustrative embodiment, in the above configuration (7), the housing body includes a pressure support portion disposed so as to protrude by a width of the gap inward in a radial direction from the inner wall surface of the housing body.

With the above configuration (8), the pressure support portion is provided, protruding by the width of the gap inward in the radial direction from the inner wall surface of the housing body. Accordingly, the outer surface of the sleeve is supported by the pressure support portion, and thus it is possible to suppress deformation of the sleeve. For instance, even if a load is applied to the sleeve due to the pressure difference between the outlet section of the housing body and the gap between the inner wall surface of the housing body forming the waste-gate flow passage and the outer surface of the sleeve, it is possible to suppress deformation of the sleeve due to the load, by providing the pressure support portion having the above configuration.

(9) In an illustrative embodiment, in the above configuration (7) or (8), the turbine housing further includes a heat-insulating material disposed in the gap.

With the above configuration (9), the heat-insulating material is disposed in the gap between the outer surface of the sleeve and the inner wall surface of the housing body forming the waste-gate flow passage, and thus it is possible to suppress heat input to the turbine housing from exhaust gas and to reduce loss of thermal energy of exhaust gas even further.

(10) In an illustrative embodiment, in any one of the above configurations (1) to (9), the housing body includes a protruding portion disposed so as to protrude inward in a radial direction from the inner wall surface of the housing body so as to be in contact with an end portion on a side of the inlet section of the sleeve.

With the above configuration (10), the end portion of the inlet-section side of the sleeve is supported on the housing body by being in contact with the protruding portion disposed protruding inward in the radial direction from the inner wall surface of the housing body, and thus it is possible to fix the sleeve stably to the housing body.

(11) In an illustrative embodiment, in any one of the above configurations (1) to (9), an end portion on a side of the inlet section of the sleeve has a shape which extends outward in a radial direction toward an upstream side with respect to the flow direction of the exhaust gas in the waste-gate flow passage.

With the above configuration (11), the end portion of the inlet-section side of the sleeve has a shape which extends outward in the radial direction toward the upstream side with respect to the flow direction of exhaust gas in the waste-gate flow passage. Thus, the inlet-section side end portion of the sleeve guides exhaust gas flowing into the waste-gate flow passage from the inlet section of the housing body smoothly, which makes it possible to suppress occurrence of separation in the flow of exhaust gas and reduce pressure loss of exhaust gas.

(12) In an illustrative embodiment, in any one of the above configurations (1) to (11), the sleeve includes a thermal barrier coating disposed on an inner surface of the sleeve.

With the above configuration (12), the thermal barrier coating is disposed on the inner surface of the sleeve, and thus it is possible to suppress heat input to the turbine housing from exhaust gas in the waste-gate flow passage, and to suppress loss of thermal energy of exhaust gas.

(13) According to some embodiments of the present invention, an exhaust turbine includes: the turbine housing according to any one of the above (1) to (12); and a turbine wheel accommodated in the turbine housing.

With the above configuration (13), the turbine housing according to any one of the above (1) to (12) is provided, and thus it is possible to suppress loss of thermal energy of exhaust gas flowing into the exhaust gas turbine. Further, it is possible to produce the turbine housing easily, and thus the manufacturability of the exhaust turbine is improved.

(14) According to some embodiments of the present invention, a turbocharger includes: the exhaust turbine according to the above (13); and a compressor configured to be driven by the exhaust turbine.

With the above configuration (14), the above exhaust turbine (13) is provided, and thus it is possible to suppress loss of thermal energy of exhaust gas flowing into the exhaust turbine. Further, it is possible to produce the exhaust turbine easily, and thus the manufacturability of the turbocharger is improved.

Advantageous Effects

According to some embodiments of the present invention, by providing a sleeve for the waste-gate flow passage, it is possible to reduce contact area between exhaust gas and the inner wall surface of the housing body forming the waste-gate flow passage, and suppress thermal energy loss of exhaust gas. Further, the sleeve is provided separately from the housing body, and thus it is sufficient if the sleeve is machined solely upon production, and thus the turbine housing can be produced easily.

DETAILED DESCRIPTION

Embodiments of the present invention will now be described in detail with reference to the accompanying drawings. It is intended, however, that unless particularly identified, dimensions, materials, shapes, relative positions and the like of components described in the embodiments shall be interpreted as illustrative only and not intended to limit the scope of the present invention.

For instance, an expression of an equal state such as "same" "equal" and "uniform" shall not be construed as indicating only the state in which the feature is strictly equal, but also includes a state in which there is a tolerance or a difference that can still achieve the same function. On the other hand, an expression such as "comprise", "include", "have", "contain" and "constitute" are not intended to be exclusive of other components.

In the following description, firstly, an example of an overall configuration of a turbocharger according to some embodiments will be described with reference to FIG. 1. Next, with reference to FIGS. 2 to 4, an example of a turbine housing according to some embodiments and two modified examples will be described. Then, with reference to FIGS. 5 and 6, an example and a modified example of a heat shield structure of a turbine housing according to some embodiments will be described.

Figure 1:
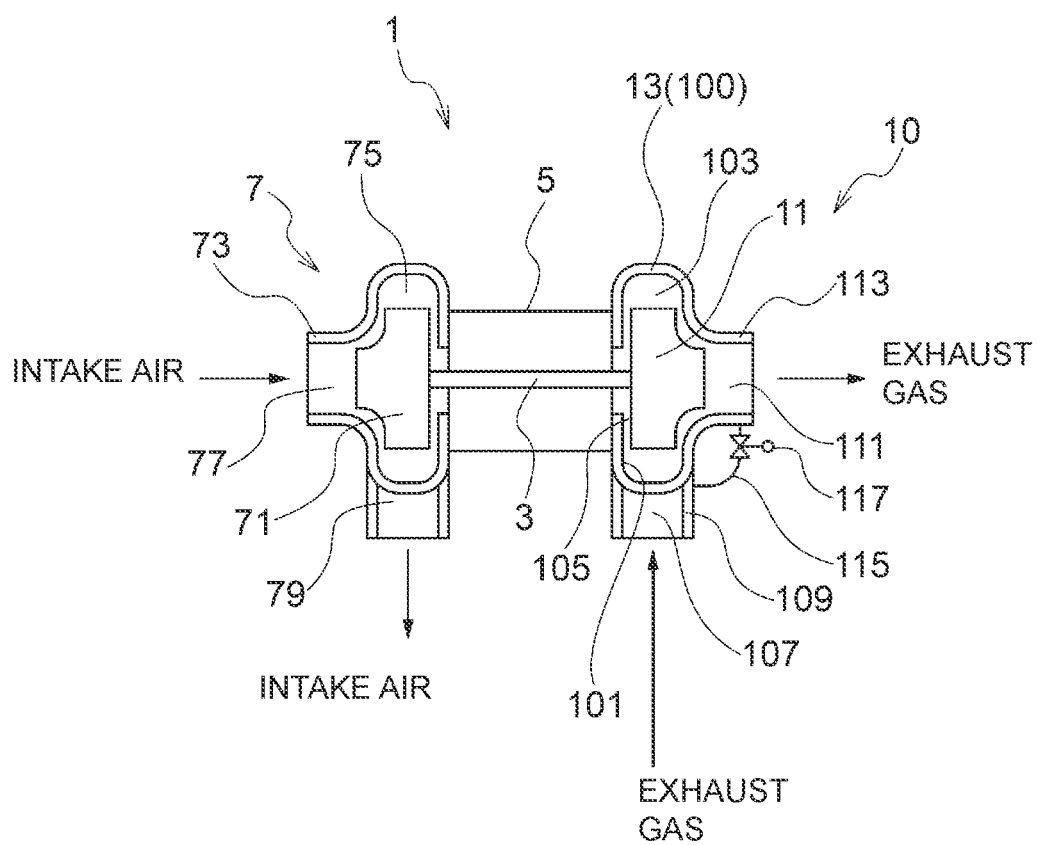
FIG. 1 is a schematic diagram of a turbocharger according to some embodiments of the present invention.

FIG. 1 is a schematic configuration diagram of a turbocharger according to some embodiments of the present invention. Further, in some embodiments, the turbocharger is a turbocharger mounted to engines for automobiles, for instance.

As shown in FIG. 1, the turbocharger 1 includes a rotational shaft 3, a compressor 7 disposed on one end side of the rotational shaft 3, and an exhaust turbine 10 disposed on the other end side of the rotational shaft 3. Further, the turbocharger 1 includes a bearing housing 5 which includes, inside thereof, a radial bearing (not depicted) supporting the rotational shaft 3 rotatably, and a thrust bearing (not depicted) supporting the thrust force of the rotational shaft 3.

The compressor 7 includes an impeller 71 disposed on one end side of the rotational shaft 3, and a compressor housing 73 accommodating the impeller 71. The compressor housing includes a compressor scroll flow passage 75 having a spiral shape formed on an outer peripheral part of the compressor housing 73, and the impeller 71 is housed at the center part of the compressor scroll flow passage 75. Further, the compressor housing 73 includes an inlet flow passage 77 for guiding intake air to be supplied to the engine or the like to the impeller 71. The inlet flow passage 77 extends along the axial direction of the rotational shaft 3. Further, the compressor housing 73 includes an outlet flow passage 79 for guiding intake air discharged from the impeller 71 and having passed through the compressor scroll flow passage 75 to the outside of the compressor housing 73.

Furthermore, the exhaust turbine 10 includes a turbine wheel 11 disposed on the other end side of the rotational shaft 3, and a turbine housing 13 that accommodates the turbine wheel 11. Further, the turbine housing 13 includes a housing body 100 and a sleeve described below.

A turbine scroll flow passage 103 having a spiral shape is disposed on an outer peripheral part of the housing body 100 of the turbine housing 13. The housing body 100 includes a turbine housing part 105 for housing the turbine wheel 11, disposed on the radially inner side of the turbine scroll flow passage 103. Further, the housing body 100 includes an inlet section 109 forming an inlet flow passage 107 for guiding exhaust gas from the engine or the like to the turbine housing part 105 via the turbine scroll flow passage 103. Further, the housing body 100 includes an outlet section 113 forming an outlet flow passage 111 for discharging exhaust gas from the turbine housing part 105. The outlet section 113 extends along the axial direction of the rotational shaft 3.

Further, the housing body 100 includes a waste-gate flow passage 115 which brings the inlet flow passage 107 and the outlet flow passage 111 of the housing body 100 into communication so as to bypass the turbine housing part 105. Furthermore, on the downstream side of the waste-gate flow passage 115 with respect to the flow direction of the exhaust gas, provided is a waste-gate valve 117 for adjusting the flow rate of exhaust gas introduced to the outlet section 113 of the housing body 100 via the waste-gate flow passage 115.

Thus, when the waste-gate valve 117 is open, a part of exhaust gas from the engine or the like flowing into the inlet flow passage 107 of the housing body 100 is guided to the outlet flow passage 111 of the housing body via the waste-gate flow passage 115, without being guided to the turbine housing part 105 via the scroll flow passage 103.

Figure 2B:
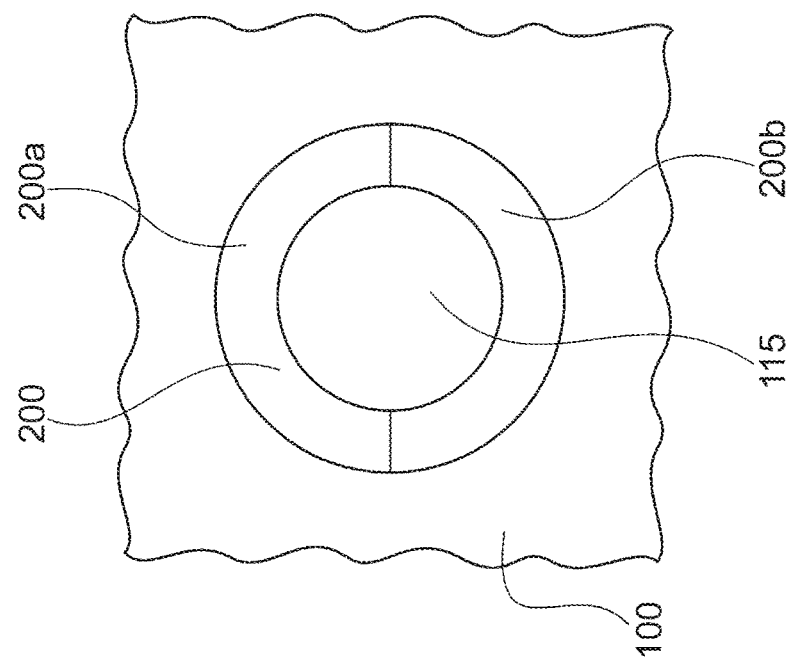
FIG. 2 is a diagram illustrating an example of a peripheral structure of a waste-gate flow passage of a turbine housing according to some embodiments of the present invention.
Figure 2A:
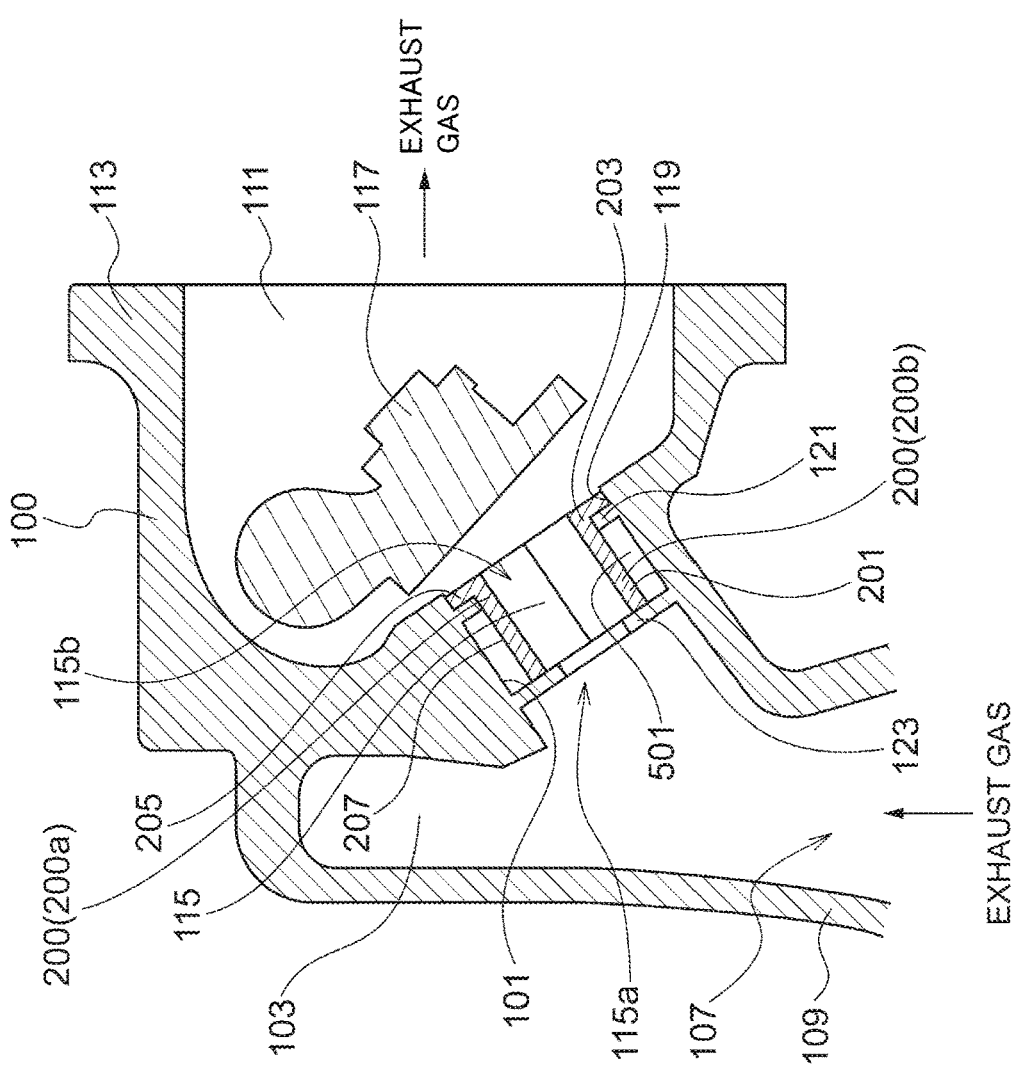

FIG. 2 is a diagram illustrating an example of a peripheral structure of a waste-gate flow passage of a turbine housing according to some embodiments of the present invention. FIG. 2A is a cross-sectional view the waste-gate flow passage and its surrounding of a turbine housing. FIG. 2B is a front view of a downstream opening of the waste-gate flow passage with respect to the flow direction of exhaust gas.

As described above, the turbine housing 13 includes the housing body 100, and the housing body 100 includes a turbine housing part 105 (FIG. 1) housing the turbine wheel 11, an inlet section 109 forming the inlet flow passage 107 for guiding exhaust gas to the turbine housing part 105, and an outlet section 113 for forming an outlet flow passage 111 for discharging exhaust gas from the turbine housing part 105. Furthermore, the housing body 100 includes a waste-gate flow passage 115 which brings the inlet flow passage 107 and the outlet flow passage 111 of the housing body 100 into communication so as to bypass the turbine housing part 105.

Further, the turbine housing 13 includes a sleeve 200 disposed along the inner wall surface 101 of the waste-gate flow passage 115 of the housing body 100. Due to the sleeve 200, the area of direct contact between the inner wall surface 101 of the housing body 100 and exhaust gas flowing through the waste-gate flow passage 115 is reduced.

Further, in some embodiments, the sleeve 200 is inserted into the waste-gate flow passage 115 and mounted to the housing body 100 from the side of the outlet section 113 toward the side of the inlet section 109, of the housing body 100.

In the present embodiment, as shown in FIGS. 2A and 2B, the sleeve 200 has a cylindrical shape extending along the flow direction of exhaust gas. In this case, the sleeve 20 may be disposed only on the downstream side 115b of the waste-gate flow passage 115 of the housing body 100 with respect to the flow direction of exhaust gas.

In another embodiment, the waste-gate flow passage 115 may be curved, and the sleeve 200 may have a shape along the curved shape of the waste-gate flow passage 115. In this case, compared to a case where the sleeve 200 has a cylindrical shape, exhaust gas flowing through the waste-gate flow passage 115 can be guided smoothly with the sleeve 200.

Further, in an illustrative embodiment shown in FIG. 2A, the sleeve 200 having a cylindrical shape is disposed only on the downstream side 115b of the waste-gate flow passage 115. Nevertheless, the present invention is not limited to this example. For instance, in another embodiment, the sleeve 200 may be disposed over the entire length of the waste-gate flow passage 115. In this case, compared to a case where the sleeve 200 is disposed only in a part of the waste-gate flow passage 115 with respect to the flow direction of exhaust gas, it is possible to reduce the contact area between the inner wall surface 101 of the housing body 100 and exhaust gas, and suppress loss of thermal energy of exhaust gas.

Further, the sleeve 200 according to the present embodiment includes a first section 200a and a second section 200b divided along the flow direction of gas, as shown in FIGS. 2A and 2B.

In some other embodiments, the sleeve 200 may be not divided in the flow direction of gas. In this case, compared to a case where the sleeve 200 is formed divided in the flow direction of gas, it is possible to enhance the strength of the sleeve 200.

Further, in yet another embodiment, the sleeve 200 may be divided into three or more sections along the flow direction of exhaust gas. Further, in addition to being divided into a plurality of sections along the flow direction of exhaust gas, each section of the sleeve 200 may be divided further along a direction orthogonal to the flow direction of exhaust gas.

Next, the support structure of the sleeve 200 with respect to the housing body 100 will be described.

The housing body 100 includes a concave portion 119 provided along the peripheral edge of the opening end of the downstream side 115b of the waste-gate flow passage 115 with respect to the flow direction of exhaust gas.

Furthermore, the sleeve 200 includes a convex portion 205 disposed so as to project outward in the radial direction of the sleeve 200, on a downstream end portion 203 of the sleeve 200 with respect to the flow direction of exhaust gas. Further, the convex portion 205 is engaged with the concave portion 119 of the housing body 100.

Further, in some embodiments, the convex portion 205 of the sleeve 200 may be fixed to the concave portion 119 of the housing body 100 by laser welding, for instance. Further, in some other embodiments, the convex portion 205 of the sleeve 200 may be fixed to the concave portion 119 of the housing body 100 only by fitting, such as shrink fitting and cool fitting.

The sleeve 200 is supported on the housing body 100, such that a gap 501 is formed between the outer surface 207 of the sleeve 200 and the inner wall surface 101 of the housing body 100 forming the waste-gate flow passage 115.

Further, the housing body 100 includes a pressure support portion 121 disposed protruding by the width of the gap 501 inward in the radial direction, from the inner wall surface 101 of the housing body 100. In the present embodiment, the pressure support portion 121 is an annular member formed so as to be adjoining to the upstream side of the concave portion 119 of the housing body 100 with respect to the flow direction of exhaust gas, and has an inner peripheral surface which is in contact with the outer surface 207 of the sleeve 200. Further, the downstream side surface of the pressure support portion 121 with respect to the flow direction of exhaust gas is in contact with the convex portion 205 of the sleeve 200.

A load is applied to the downstream end portion 203 of the sleeve 200 with respect to the flow direction of exhaust gas, due to the differential pressure between the outlet section 113 and the gap 501 of the housing body 100. In the present embodiment, the outer surface 207 of the sleeve 200 is supported by the pressure support portion 121. Thus, even when such a load is applied to the sleeve 200, it is possible to suppress deformation of the sleeve 200.

Further, the housing body 100 includes a protruding portion 123 disposed protruding inward in the radial direction from the inner wall surface 101 of the housing body 100, so as to be in contact with an end portion 201 of the sleeve 200 on the upstream side of exhaust gas (a portion of the sleeve 200 on the side of the inlet section 109 of the turbine housing 100). Further, the sleeve 200 is supported on the housing body 100 as the end portion 201 of the sleeve 200 on the upstream side of exhaust gas makes contact with the protruding portion 123 of the housing body 100.

Further, in some embodiments, the shape of the inner peripheral surface of the protruding portion 123 of the housing body 100 may extend outward in the radial direction toward the upstream side with respect to the flow direction of exhaust gas in the waste-gate flow passage 115. In this way, it is possible to guide exhaust gas flowing through the waste-gate flow passage 115 smoothly.

Figure 3B:
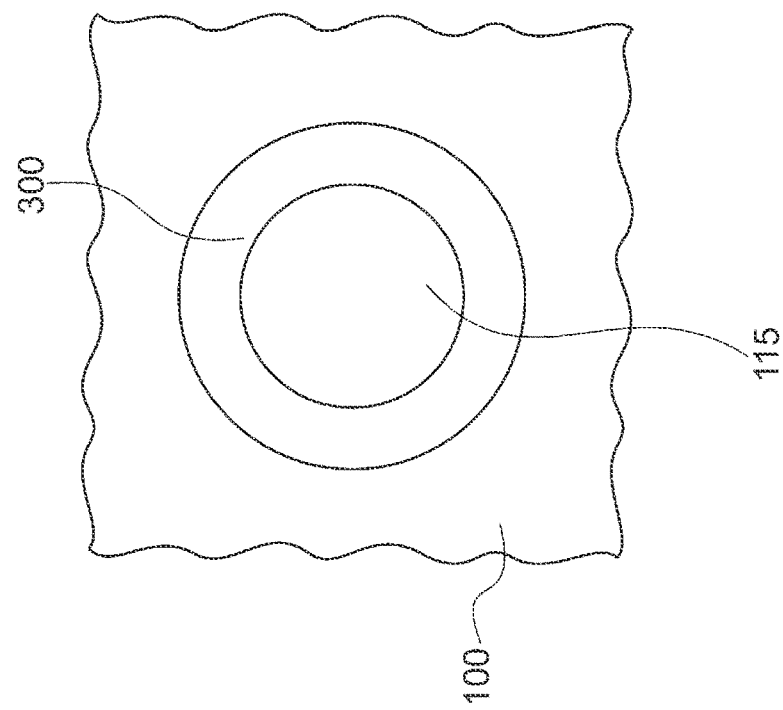
FIG. 3 is a diagram illustrating a modified example of a peripheral structure of a waste-gate flow passage of a turbine housing according to some embodiments of the present invention.
Figure 3A:
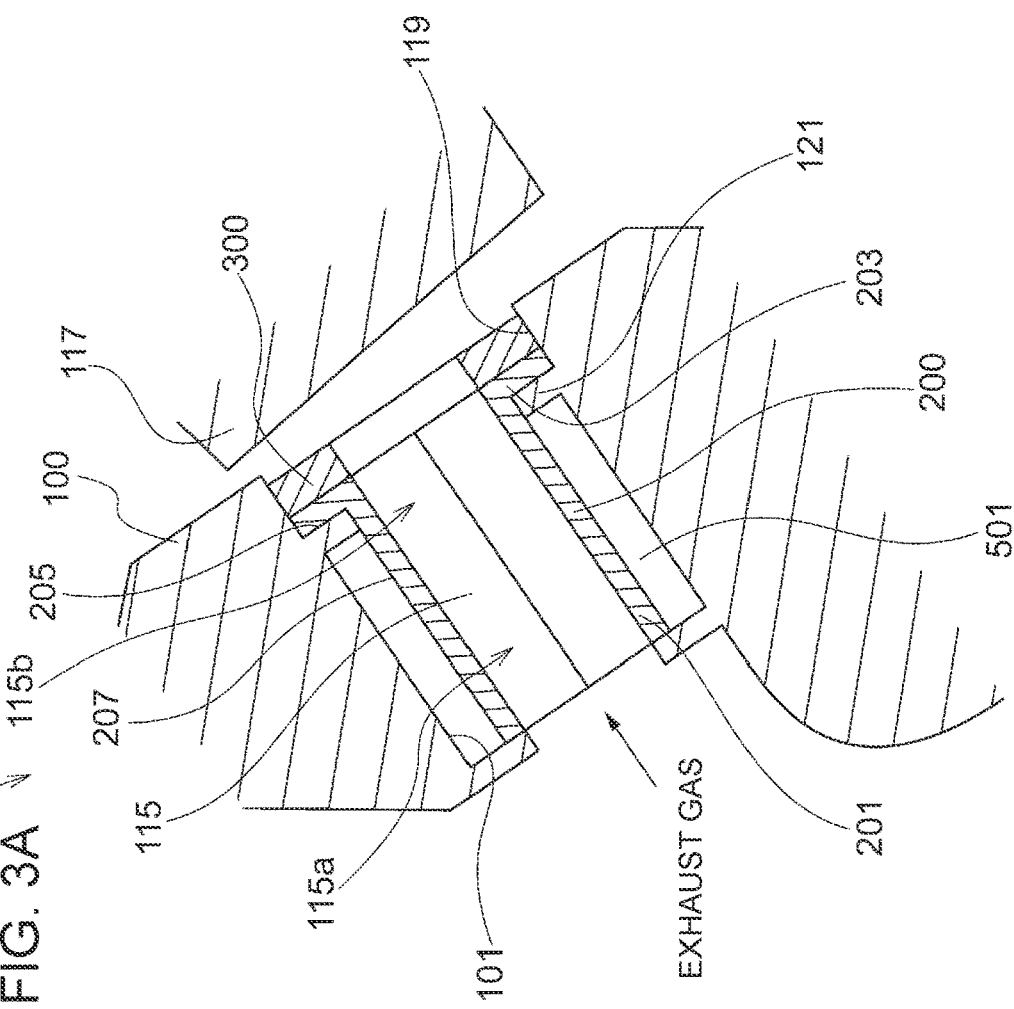

In some embodiments, a modified example described below may be applied to the turbine housing. FIG. 3 is a diagram illustrating a modified example of a peripheral structure of a waste-gate flow passage of a turbine housing according to some embodiments of the present invention. FIG. 3A is a cross-sectional view of the waste-gate flow passage and its surrounding of a turbine housing. FIG. 3B is a front view of a downstream opening of the waste-gate flow passage with respect to the flow direction of exhaust gas.

As shown in FIGS. 3A and 3B, the turbine housing 13 of the present modified example further includes a fixing piece 300 for fixing the sleeve 200 to the housing body 100. In the present modified example, the fixing piece 300 is an annular member, and is engaged with the concave portion 119 of the housing body 100. Further, the convex portion 205 of the sleeve 200 is held between the fixing piece 300 and the housing body 100, while being engaged with the concave portion 119 of the housing body 100.

In some embodiments, the fixing piece 300 may be fixed to the concave portion 119 of the housing body 100 by welding.

According to the present modified example, the convex portion 205 of the sleeve 200 is held between the fixing piece 300 and the housing body 100 while being engaged with the concave portion 119 of the housing body 100, and thus the sleeve 200 can be firmly fixed to the housing body 100.

According to the present modified example, the fixing piece 300 is provided, and thus it is possible to fix the fixing piece 300 to the housing body 100 by welding, and hold the convex portion 205 of the sleeve 200 between the fixing piece 300 and the housing body 100. Accordingly, it is possible to fix the sleeve 200 to the housing body 100 more securely.

Furthermore, in a case where the sleeve 200 is directly fixed to the housing body 100 by welding, the sleeve 200 has a small thickness, and heat generated from welding may cause deformation of the sleeve 200. In this regard, by fixing the fixing piece 300 to the housing body 100 by welding instead of the sleeve 200, it is possible to fix the sleeve 200 firmly to the housing body 100 while suppressing deformation of the sleeve 200.

Figure 4:
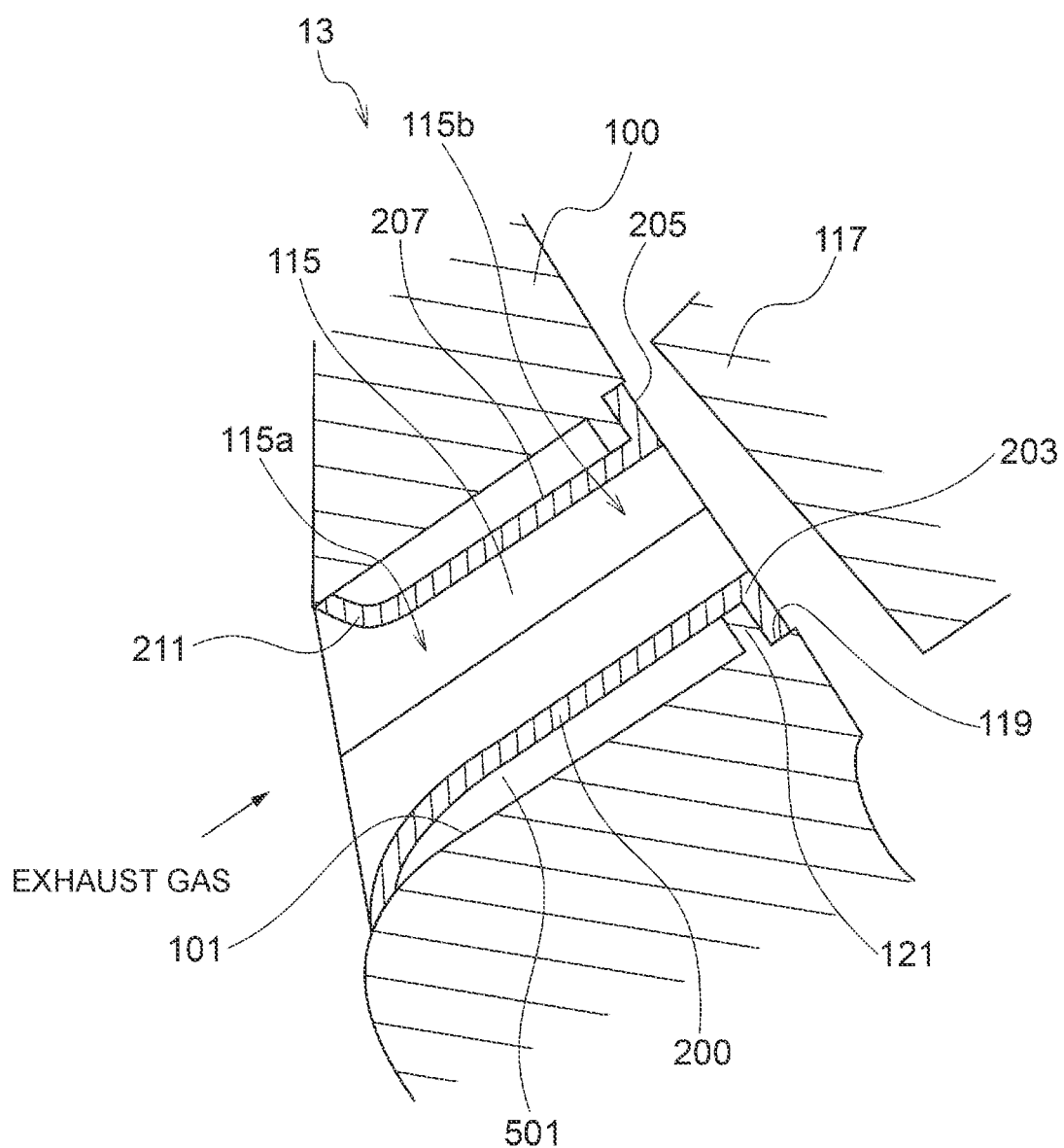
FIG. 4 is a diagram illustrating another modified example of a peripheral structure of a waste-gate flow passage of a turbine housing according to some embodiments of the present invention.

Further, in some embodiments, another modified example described below may be applied to the turbine housing. FIG. 4 is a diagram illustrating another modified example of a peripheral structure of a waste-gate flow passage of a turbine housing according to some embodiments of the present invention.

As shown in FIG. 4, in the turbine housing 13 according to the present modified example, the end portion 211 of the sleeve 200 on the upstream side of exhaust gas has a shape which extends outward in the radial direction toward the upstream side 115a with respect to the flow direction of exhaust gas in the waste-gate flow passage 115. Thus, the end portion 211 on the inlet-section side of the sleeve guides exhaust gas flowing into the waste-gate flow passage 115 from the inlet section 109 of the housing body 100 smoothly, which makes it possible to suppress occurrence of separation in the flow of exhaust gas and reduce pressure loss of exhaust gas.

Figure 5:
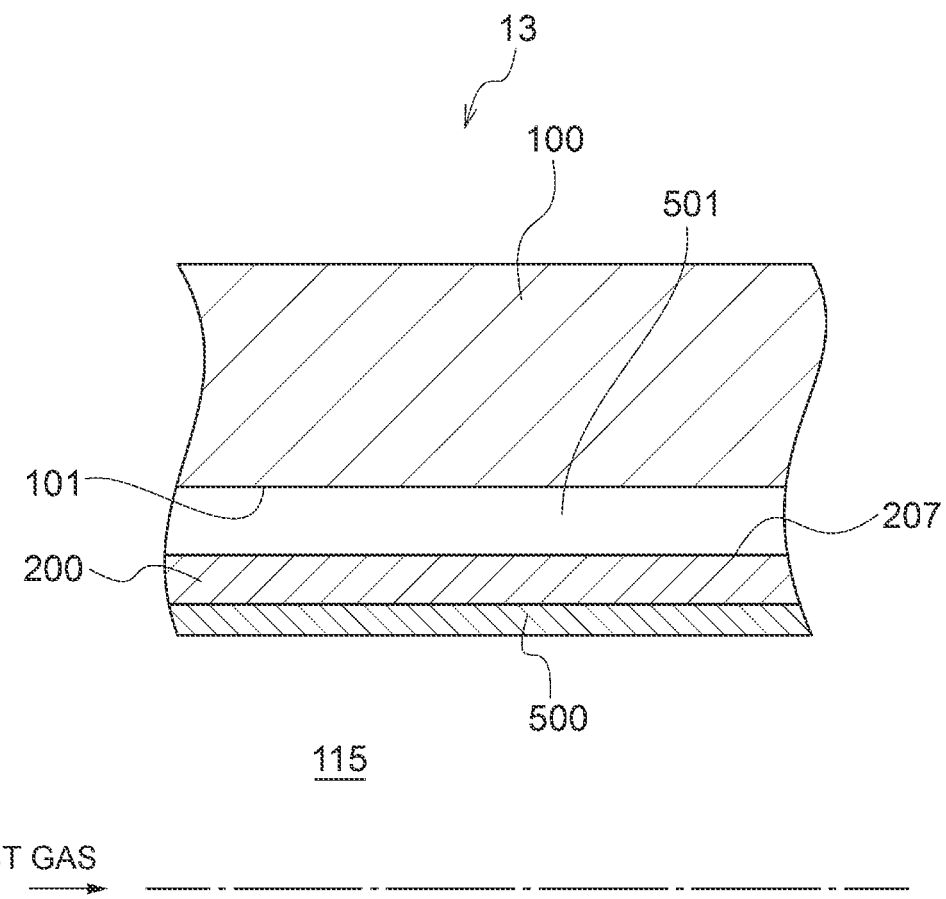
FIG. 5 is a diagram of an example of a heat shield structure of a turbine housing according to some embodiments of the present invention.

Next, with reference to FIG. 5, an example of a heat shield structure of a turbine housing according to some embodiments of the present invention will be described. FIG. 5 is a diagram of an example of a heat shield structure of a turbine housing according to some embodiments of the present invention.

As shown in FIG. 5, in some embodiments, the turbine housing 13 includes a thermal barrier coating 500 on the inner surface of the sleeve 200. The thermal barrier coating 500 can be, for instance, formed by spraying.

That is, according to the present embodiment, the gap 501 is formed between the inner wall surface 101 of the housing body 100 and the outer surface 207 of the sleeve 200, and a thermal barrier coating 500 is formed on the inner surface of the sleeve 200. Further, the three layers including the gap 501, the sleeve 200, and the thermal barrier coating 500 separate the waste-gate flow passage 115 from the inner wall surface of the housing body 100.

Further, with the thermal barrier coating 500, it is possible to block entry of heat into the sleeve 200 from exhaust gas in the waste-gate flow passage 115, and thereby it is possible to further reduce heat input from exhaust gas to the turbine housing 13.

Further, for instance, in a case where the sleeve 200 is divided into two sections along the flow direction of exhaust gas and the thermal barrier coating 500 is formed by spraying on the inner surface of the sleeve 200 by welding, it is possible to form the thermal barrier coating 500 easily compared to a cylindrical sleeve having an integrated structure.

Figure 6:
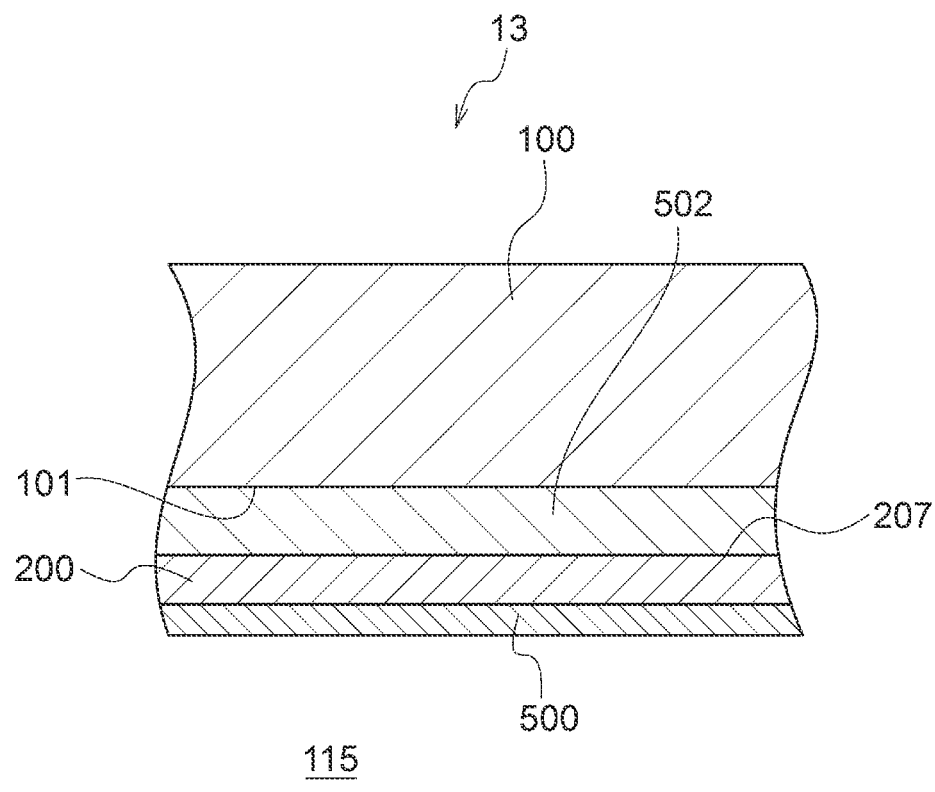
FIG. 6 is a diagram showing a modified example of a heat shield structure of a turbine housing according to some embodiments of the present invention.

Next, with reference to FIG. 6, a modified example of a heat shield structure of a turbine housing according to some embodiments of the present invention will be described. FIG. 6 is a diagram showing a modified example of a heat shield structure of a turbine housing according to some embodiments of the present invention.

As shown in FIG. 6, in some embodiments, the turbine housing 13 includes a heat insulator 502 disposed in the gap 501 between the inner wall surface 101 of the housing body 100 and the outer surface 207 of the sleeve 200.

With the heat insulator 502, it is possible to reduce the quantity of heat transmitted to the turbine housing 13 from the sleeve 200, and thereby it is possible to further reduce heat input from exhaust gas to the turbine housing 13.

Further, while the thermal barrier coating 500 is formed on the inner surface of the sleeve 200 in the illustrative embodiment of the present modified example, this is not limitative, and some embodiments may not necessarily include the thermal barrier coating 500.

According to some embodiments described above, the sleeve 200 is disposed at least on the downstream side 115b of the waste-gate flow passage 115 of the housing body 100 with respect to the flow direction of exhaust gas, along the inner wall surface 101 of the housing body 100 forming the waste-gate flow passage 115, and thus it is possible to reduce the contact area between exhaust gas and the inner wall surface 101 of the housing body 100 forming the waste-gate flow passage 115, and suppress thermal energy loss of exhaust gas.

Accordingly, in a case where a catalyst is disposed on the downstream side of the exhaust turbine 10 in the flow direction of exhaust gas to purify harmful components in the exhaust gas, it is possible to maintain the high temperature of exhaust gas discharged from the exhaust turbine 10. Thus, when the turbocharger 1 is to be started, it is possible to shorten the time it takes to activate the catalyst.

Further, according to the above described embodiment, the sleeve 200 is provided separately from the housing body 100, and thus it is sufficient if the sleeve 200 is machined solely upon production, and thus the turbine housing 13 can be produced easily.

Further, according to the above embodiment, the sleeve 200 includes a plurality of sections (200a, 200b) divided along the flow direction of exhaust gas, and thus it only needs to machine the sleeve 200 by sections upon production, and the manufacturability is improved compared to a turbine casing that includes a sleeve having an integrated structure.

Further, according to the above embodiment, the sleeve 200 has a cylindrical shape extending along the flow direction of exhaust gas, and thus it is possible to machine the sleeve 200 easily upon production compared to a sleeve having a curved complex shape, and the turbine housing 13 can be produced more easily.

Furthermore, since the sleeve 200 has a cylindrical shape extending along the flow direction of exhaust gas, the sleeve 200 can be easily inserted in the waste-gate flow passage 115 compared to a sleeve having a curved complex shape when producing the turbine housing by inserting the sleeve 200 into the waste-gate flow passage 115 from the side of the outlet section 113 toward the inlet section 109 of the housing body 100, and thus the turbine housing 13 can be produced more easily.

Herein, the inner wall surface 101 of the housing body 100 on the upstream side 115a of the waste-gate flow passage 115 with respect to the flow direction of exhaust gas may be formed to have a complex curved surface shape, to guide exhaust gas smoothly from the inlet section 109 of the housing body 100. In this case, providing the sleeve 200 over the entire length of the waste-gate flow passage 115 may make it difficult to achieve the originally-designed curved surface shape of the waste-gate flow passage 115.

According to the above described embodiment, the sleeve 200 is disposed only on the downstream side 115b of the waste-gate flow passage 115 of the housing body 100 with respect to the flow direction of exhaust gas, and thus it is possible to provide the sleeve 200 along the inner wall surface 101 of the housing body 100 without obstructing the curved surface shape of the inner wall surface 101, even in a case where the inner wall surface 101 of the housing body 100 has a complex curved surface shape on the upstream side 115a of the waste-gate flow passage 115 with respect to the flow direction of exhaust gas.

Further, according to the above embodiment, the concave portion 119 of the housing body 100 disposed along the peripheral edge of the opening end of the downstream side 115b of the waste-gate flow passage 115 with respect to the flow direction of exhaust gas is engaged with the convex portion 205 disposed projecting outward in the radial direction of the sleeve 200, and thus it is possible to determine the position of the sleeve 200 relative to the housing body 100. In this way, it is possible to assemble the sleeve 200 easily with the housing body 100, and the manufacturability of the turbine housing 13 is improved.

Furthermore, according to the above described embodiment, the sleeve 200 is supported on the housing body 100 such that the gap 501 is formed between the outer surface 207 of the sleeve 200 and the inner wall surface 101 of the housing body 100 forming the waste-gate flow passage 115, and thus heat input from exhaust gas to the turbine housing 13 is suppressed by the gap 501, which makes it possible to reduce thermal energy loss of exhaust gas even further.

Further, according to the above embodiment, the pressure support portion 121 is provided, protruding by the width of the gap 501 inward in the radial direction from the inner wall surface 101 of the housing body 100. Accordingly, the outer surface 207 of the sleeve 200 is supported by the pressure support portion 121, and thus it is possible to suppress deformation of the sleeve 200. For instance, even if a load is applied to the sleeve 200 due to the pressure difference between the outlet section 113 of the housing body 100 and the gap 501 between the inner wall surface 101 of the housing body 100 forming the waste-gate flow passage 115 and the outer surface 207 of the sleeve 200, it is possible to suppress deformation of the sleeve 200 due to the load, by providing the pressure support portion 121 having the above configuration.

Further, according to the above embodiment, the end portion 201 of the upstream side of the sleeve 200 with respect to the flow direction of the sleeve 200 is supported on the housing body 100 by being in contact with the protruding portion 123 disposed protruding inward in the radial direction from the inner wall surface 101 of the housing body 100, and thus it is possible to fix the sleeve 200 stably to the housing body 100.

DESCRIPTION OF REFERENCE NUMERALS

1 Turbocharger
3 Rotational shaft
5 Bearing housing
7 Compressor
71 Impeller
73 Compressor housing
75 Compressor scroll flow passage
77 Compressor inlet flow passage
79 Compressor outlet flow passage
10 Exhaust turbine
11 Turbine wheel
13 Turbine housing
100 Housing body
101 Inner wall surface
103 Turbine scroll flow passage
105 Turbine housing part
107 Inlet flow passage
109 Inlet section
111 Outlet flow passage
113 Outlet section
115 Waste-gate flow passage
115a Upstream side of waste-gate flow passage
115b Downstream side of waste-gate flow passage
117 Waste-gate valve
119 Concave portion
121 Pressure support portion
123 Protruding portion
200 Sleeve
200a First section of sleeve
200b Second section of sleeve
201 End portion of inlet section side of sleeve
211 End portion of inlet section side of sleeve (modified example)
203 End portion of outlet section side of sleeve
205 Convex portion
207 Outer surface of sleeve
300 Fixing piece
500 Thermal barrier coating
501 Gap
502 Heat insulator

The invention claimed is:

1. A turbine housing, comprising:
a housing body which includes a turbine housing part housing a turbine wheel, an inlet section forming an inlet flow passage for guiding exhaust gas to the turbine housing part, an outlet section forming an outlet flow passage for discharging the exhaust gas from the turbine housing part, and a waste-gate flow passage which brings the inlet flow passage and the outlet flow passage into communication so as to bypass the turbine housing part; and
a sleeve disposed along an inner wall surface of the housing body forming the waste gate flow passage, at least on a downstream side of the waste-gate flow passage of the housing body with respect to a flow direction of the exhaust gas,
wherein the sleeve includes a plurality of sections divided along the flow direction of the exhaust gas.

2. The turbine housing according to claim 1,
wherein the sleeve has a cylindrical shape extending along the flow direction of the exhaust gas.

3. The turbine housing according to claim 1,
wherein the sleeve is disposed only on the downstream side of the waste-gate flow passage of the housing body with respect to the flow direction of the exhaust gas.

4. The turbine housing according to claim 1,
wherein the housing body includes a concave portion disposed along a peripheral edge of an opening end on the downstream side of the waste-gate flow passage of the housing body with respect to the flow direction of the exhaust gas, and wherein the sleeve includes a convex portion disposed so as to project outward in a radial direction of the sleeve so as to be engaged with the concave portion.

5. The turbine housing according to claim 4, further comprising a fixing piece for fixing the sleeve to the housing body, wherein the convex portion of the sleeve is held between the fixing piece and the housing body while being in engagement with the concave portion of the housing body.

6. The turbine housing according to claim 1, wherein the sleeve is supported on the housing body so that a gap is formed between the inner wall surface of the housing body forming the waste-gate flow passage and an outer surface of the sleeve.

7. The turbine housing according to claim 6, further comprising a heat-insulating material disposed in the gap.

8. The turbine housing according to claim 1, wherein the housing body includes a protruding portion disposed so as to protrude inward in a radial direction from the inner wall surface of the housing body so as to be in contact with an end portion on a side of the inlet section of the sleeve.

9. The turbine housing according to claim 1, wherein the sleeve includes a thermal barrier coating on an inner surface of the sleeve.

10. An exhaust turbine, comprising:

the turbine housing according to claim 1; and a turbine wheel accommodated in the turbine housing.

11. A turbocharger, comprising:

the exhaust turbine according to claim 10; and a compressor configured to be driven by the exhaust turbine.

12. A turbine housing, comprising:

a housing body which includes a turbine housing part housing a turbine wheel, an inlet section forming an inlet flow passage for guiding exhaust gas to the turbine housing part, an outlet section forming an outlet flow passage for discharging the exhaust gas from the turbine housing part, and a waste-gate flow passage which brings the inlet flow passage and the outlet flow passage into communication so as to bypass the turbine housing part, and a sleeve disposed along an inner wall surface of the housing body forming the waste gate flow passage, at least on a downstream side of the waste-gate flow passage of the housing body with respect to a flow direction of the exhaust gas, wherein the sleeve is supported on the housing body so that a gap is formed between the inner wall surface of the housing body forming the waste-gate flow passage and an outer surface of the sleeve, wherein the housing body includes a pressure support portion disposed so as to protrude by a width of the gap inward in a radial direction from the inner wall surface of the housing body.

13. A turbine housing, comprising:

a housing body which includes a turbine housing part housing a turbine wheel, an inlet section forming an inlet flow passage for guiding exhaust gas to the turbine housing part, an outlet section forming an outlet flow passage for discharging the exhaust gas from the turbine housing part, and a waste-gate flow passage which brings the inlet flow passage and the outlet flow passage into communication so as to bypass the turbine housing part; and a sleeve disposed along an inner wall surface of the housing body forming the waste gate flow passage, at least on a downstream side of the waste-gate flow passage of the housing body with respect to a flow direction of the exhaust gas, wherein an end portion on a side of the inlet section of the sleeve has a shape which extends outward in a radial direction toward an upstream side with respect to the flow direction of the exhaust gas in the waste-gate flow passage.

* * * * *